Nov. 11, 1958     M. DANTZIC     2,859,568
LENS BLOCKING APPARATUS
Filed Oct. 4, 1957

INVENTOR.
MORRIS DANTZIC
BY
Raymond W. Colton
ATTORNEY

United States Patent Office 2,859,568
Patented Nov. 11, 1958

2,859,568
LENS BLOCKING APPARATUS
Morris Dantzic, Cumberland, Md.
Application October 4, 1957, Serial No. 688,222
9 Claims. (Cl. 51—216)

This invention relates to lens blocking apparatus particularly adapted for the blocking of lens blanks whose transparency is insufficient to permit the use of blocking apparatus of conventional types.

With the increased use of sun glasses ground in accordance with prescriptions, the problem of locating such blanks on a block has become accentuated. The blocking of transparent lenses is readily accomplished by aligning marks on the lenses with points on the block visible through such lenses. As the transparency of the lens blanks becomes less, the difficulty of alignment is increased.

It is accordingly, among the objects of this invention to provide an illuminated lens block with which light beams can be employed instead of fixed points so that the light beams will be visible through even the most opaque lens blanks encountered to date. The lens blocking apparatus constituting the subject matter of this invention comprises a block having a radial surface adapted to receive a lens blank, the block containing a light source receiving cavity, containing a plurality of aligned openings intersecting the radial surface and having light conducting passages interconnecting the openings and cavity. Certain of the openings are preferably fixed relative to the block and certain of them may be formed in elements which are removable from the block. The radial surface of the block is usually concave adapting it to the reception of pitch for securing the lens blank thereto once its location has been determined. The block receives one or more removable plugs, in one of its forms, each containing an opening in alignment with the aligned openings and in light conducting communication with the cavity. A section of the block preferably has a periphery forming a circle and the openings are aligned along a diameter of such circle. The light source receiving cavity preferably has an axis parallel to such diameter. To assure proper orientation of the passages provided for the plugs, each plug and the block are provided with key and keyway arrangements.

A more complete understanding of the invention will follow a description of the accompanying drawing wherein.

Figure 1:
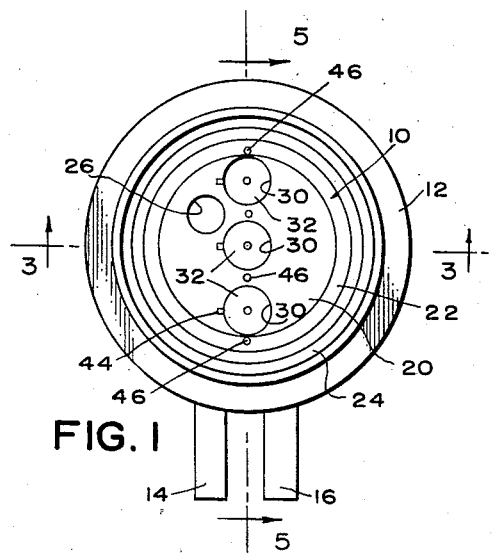
Fig. 1 is a plan view depicting a block embodying the present invention received in a conventional ring.
Figure 4:
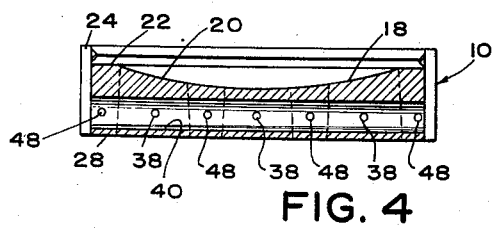
Fig. 4 is a section taken along line 4—4 of Fig. 3.

The block 10 is shown in Fig. 1 within a conventional ring 12. Whereas the particular ring shown is provided with tubes 14 and 16 for the circulation of cooling fluid, any other type can be substituted since the ring itself constitutes no part of the present invention and for that reason has not been shown in the other figures.

The upper radial surface 18 of the block is defined by a concave portion 20, a plane portion 22 and a rim portion 24 adapted to engage the convex portion of a lens to be ground. In accordance with conventional practice, an opening 26 is formed through the block in an axial direction to permit the introduction of pitch through the lower radial surface 28 of the block into the space defined between the convex surface of the lens and the radial surface 18 of the block.

Figure 2:
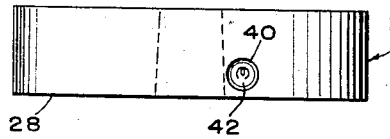
Fig. 2 is an elevation of the block on a somewhat larger scale depicting a cavity for receiving a light source.
Figure 3:
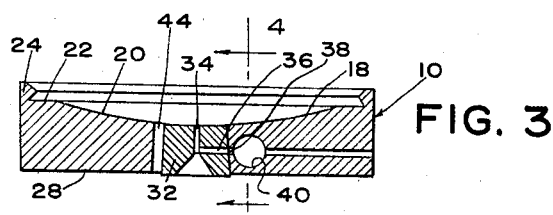
Fig. 3 is a section taken along line 3—3 of Fig. 1 of the block only and on a somewhat enlarged scale.
Figure 5:
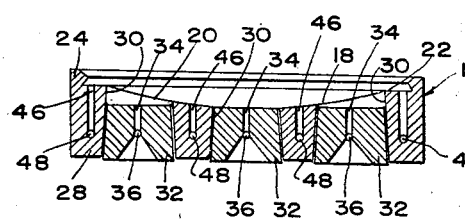
Fig. 5 is a section taken along line 5—5 of Fig. 1 of the block only on a somewhat enlarged scale.

Three frusto conical openings 30 converge from the lower radial surface 28 to the upper radial surface 18 for the reception of a like number of plugs 32 having similar frusto conical outer peripheries for frictional engagement with these openings. Each of the plugs contains an axial opening 34 intersecting its upper surface and intersecting a radial opening 36 formed therein. Each such radial opening registers with an opening 38 formed in the block 10 to provide light communication with a light source receiving cavity 40 formed in the block. A suitable light source 42 has been depicted in Fig. 2 as received within the cavity 40. To assure registration of the radial passages 36 with the passages 38 formed in the block, each plug 32 is provided with a key 44 which is received in a complementary keyway provided in the block.

The block is also provided with fixed axial openings 46 intersecting its upper radial surface and communicating with angularly disposed passages 48 which communicate with the cavity 40 so as to conduct light therefrom to the upper radial surface of the block.

Thus it will appear that when a light source 42 or a light conducting element is energized, light will be directed therefrom, partially by reflection to the upper radial surface 18 of the block through the openings 34 formed in the plugs and the openings 46 provided in the fixed portions of the block. Since these openings are preferably of rather small diameter, the light beams emanating therefrom will be rather sharp when viewed at the upper surface of the lens blank to be positioned, permitting a degree of alignment and positioning as accurate as has been achieved with conventional equipment for the blocking of transparent lens blanks.

Whereas only one specific form of the invention has been illustrated and described, the invention should not be restricted thereto beyond the scope of the appended claims.

I claim:

1. A lens block having a radial surface adapted to receive a lens blank, said block containing a light source receiving cavity, containing a plurality of aligned openings intersecting said radial surface and having light conducting passages interconnecting said openings and cavity.

2. A lens block as set forth in claim 1 wherein certain of said openings are fixed relative to said block.

3. A lens block as set forth in claim 1 wherein certain of said openings are formed in elements removable from said block.

4. A lens block as set forth in claim 1 wherein said radial surface is concave.

5. A lens block as set forth in claim 1 wherein said block receives a plurality of removable plugs each containing an opening in alignment with said aligned openings and in light conducting communication with said cavity.

6. A lens block as set forth in claim 1 wherein a section of said block has a periphery forming a circle and said openings are aligned along a diameter of said circle.

7. A lens block as set forth in claim 6 wherein said cavity has an axis parallel to said diameter.

8. A lens block as set forth in claim 1 wherein said block receives a removable plug containing an opening in alignment with said aligned openings and in light conducting communication with said cavity.

9. A lens block as set forth in claim 8 wherein said block and plug are provided with orienting means.

References Cited in the file of this patent
UNITED STATES PATENTS

| | | |
|---|---|---|
| 2,301,035 | Golderer | Nov. 3, 1942 |
| 2,580,507 | Bernheim et al. | Jan. 1, 1952 |
| 2,748,548 | Hilsinger | June 5, 1956 |